United States Patent
Gazit et al.

(10) Patent No.: US 6,993,635 B1
(45) Date of Patent: Jan. 31, 2006

(54) SYNCHRONIZING A DISTRIBUTED MIRROR

(75) Inventors: Salit Levy Gazit, Palo Alto, CA (US); Kadir Ozdemir, San Jose, CA (US)

(73) Assignee: Intransa, Inc., San Jose, CA (US)

( * ) Notice: Subject to any disclaimer, the term of this patent is extended or adjusted under 35 U.S.C. 154(b) by 0 days.

(21) Appl. No.: 10/112,806

(22) Filed: Mar. 29, 2002

(51) Int. Cl.
*G06F 12/00* (2006.01)

(52) U.S. Cl. .................. 711/162; 711/114; 711/153

(58) Field of Classification Search ................ 711/114, 711/148, 161, 162, 112, 147, 154, 4, 170, 711/173; 714/5, 6; 707/204; 209/215
See application file for complete search history.

(56) References Cited

U.S. PATENT DOCUMENTS

| | | | | |
|---|---|---|---|---|
| 5,546,536 A | * | 8/1996 | Davis et al. ................... | 714/20 |
| 6,035,412 A | * | 3/2000 | Tamer et al. ................... | 714/6 |
| 6,073,218 A | * | 6/2000 | DeKoning et al. .......... | 711/150 |
| 6,279,078 B1 | * | 8/2001 | Sicola et al. ................. | 711/119 |
| 6,510,500 B2 | * | 1/2003 | Sarkar ......................... | 711/162 |
| 6,574,709 B1 | * | 6/2003 | Skazinski et al. ............ | 711/119 |
| 6,671,705 B1 | * | 12/2003 | Duprey et al. .............. | 707/204 |
| 6,748,502 B2 | * | 6/2004 | Watanabe et al. ........... | 711/158 |
| 2001/0010070 A1 | * | 7/2001 | Crockett et al. ............ | 711/162 |
| 2002/0042866 A1 | * | 4/2002 | Grant et al. ................. | 711/162 |
| 2002/0065998 A1 | * | 5/2002 | Buckland ..................... | 711/162 |
| 2002/0069317 A1 | * | 6/2002 | Chow et al. ................. | 711/104 |
| 2002/0129214 A1 | * | 9/2002 | Sarkar ......................... | 711/162 |
| 2002/0194442 A1 | * | 12/2002 | Yanai et al. ................. | 711/162 |
| 2003/0084242 A1 | * | 5/2003 | Strange et al. .............. | 711/114 |
| 2003/0131193 A1 | * | 7/2003 | Kodama et al. ............. | 711/114 |
| 2003/0177321 A1 | * | 9/2003 | Watanabe .................... | 711/161 |

\* cited by examiner

*Primary Examiner*—Hong Kim
*Assistant Examiner*—Shane Thomas
(74) *Attorney, Agent, or Firm*—Dorsey & Whitney LLP (57) ABSTRACT

Apparatus and methods for synchronizing a distributed mirror. A computer system incorporating the invention may divide a mirror source into N chunks, assigning N storage processors responsibility for respective chunks of the mirror. The storage processors then may communicate among themselves to synchronize a distributed mirror. The storage processors may communicate mirror source blocks or their addresses and host-initiated (user) data requests. A storage processor may assist the synchronization of a mirror. The processor may accept responsibility for a chunk of a mirror source and communicate with a second storage processor responsible for another chunk of the mirror source to synchronize the mirror. The storage processor may track addresses of source blocks currently in use for synchronization, as well as addresses of source blocks to be synchronized after the blocks currently in use for synchronization.

16 Claims, 6 Drawing Sheets

SYNCHRONIZING A DISTRIBUTED MIRROR

This invention relates to data storage, fault tolerance, data mirroring and distributed computer systems. More particularly, this invention relates to the synchronization of mirrors distributed across multiple computer systems.

BACKGROUND OF THE INVENTION

The prior art has various techniques for recovering or restoring data should a computer system crash or the system otherwise become inoperative indefinitely or permanently. One such technique is mirroring, wherein a computer system maintains identical copies of data. Mirroring is also known as "RAID Level 1," "disk shadowing," "real-time copy," and "t1 copying."

The original data is the "source", and its copies are the "mirrors." Each of the source and the mirrors is a volume. A volume may be a disk, a partition of the disk or a number of blocks of the disk or the partition. The physical extents of a mirror volume reside entirely on a single machine, typically on a single physical disk.

Figure 1:
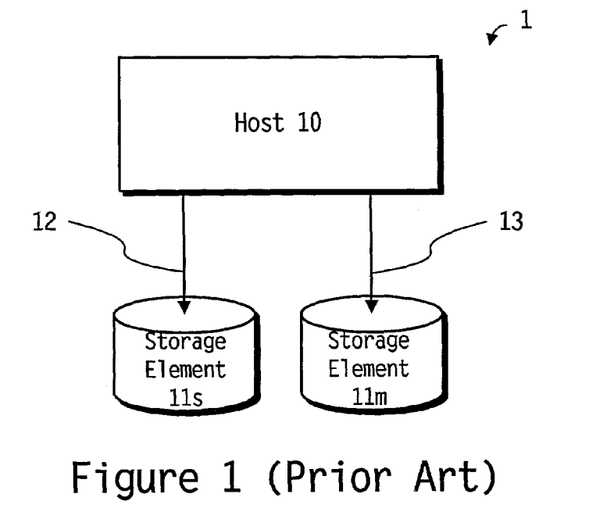
FIG. 1 illustrates a first computer system of the prior art.

FIG. 1 illustrates a computer system 1 of the prior art. The system 1 may include a host 10, storage elements 11 and communications links 12, 13. The links 12, 13 communicatively couple respective storage elements 11 to the host 10. The links 12, 13 directly connect the storage elements 11 to the host 10.

In operation, the storage element 11s serves as a source, and the storage element 11m serves as a mirror. The host 10 manages the synchronization and resilvering of the mirror 11m as necessary. Notably, all of the physical extents of the mirror 11m are responsibility of the one host 10. Indeed, the physical extents of the mirror are all on the one physical disk 11m.

Figure 2:
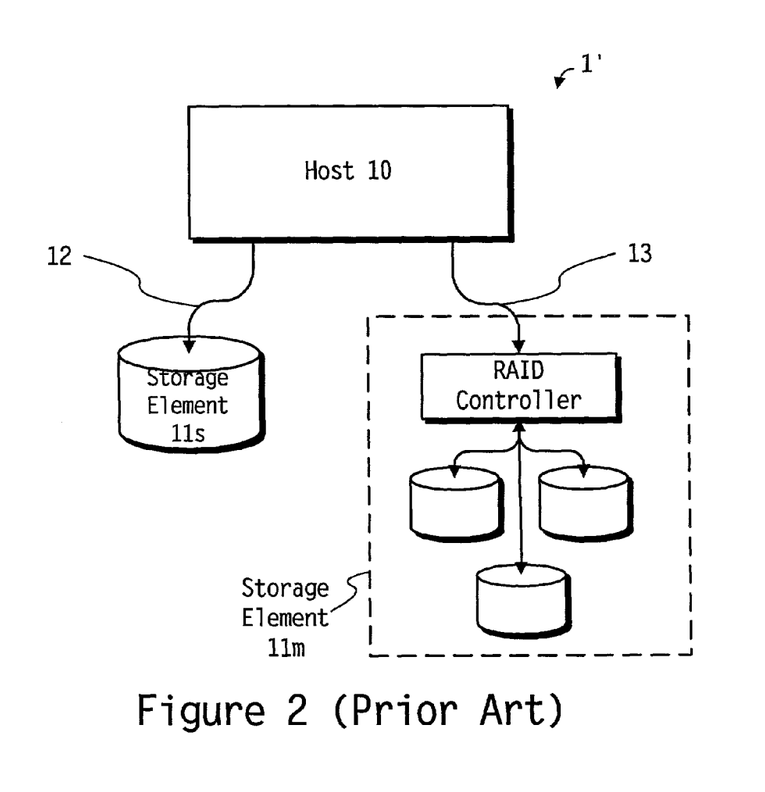
FIG. 2 illustrates a second computer system of the prior art.

FIG. 2 illustrates a computer system 1' of the prior art. The system 1' uses a storage array as the mirror 11m. While the physical extents of the mirror 11m are now distributed across multiple physical drives within the array 11m, the physical extents of the mirror 11m are still the responsibility of the one host 10.

Figure 3:
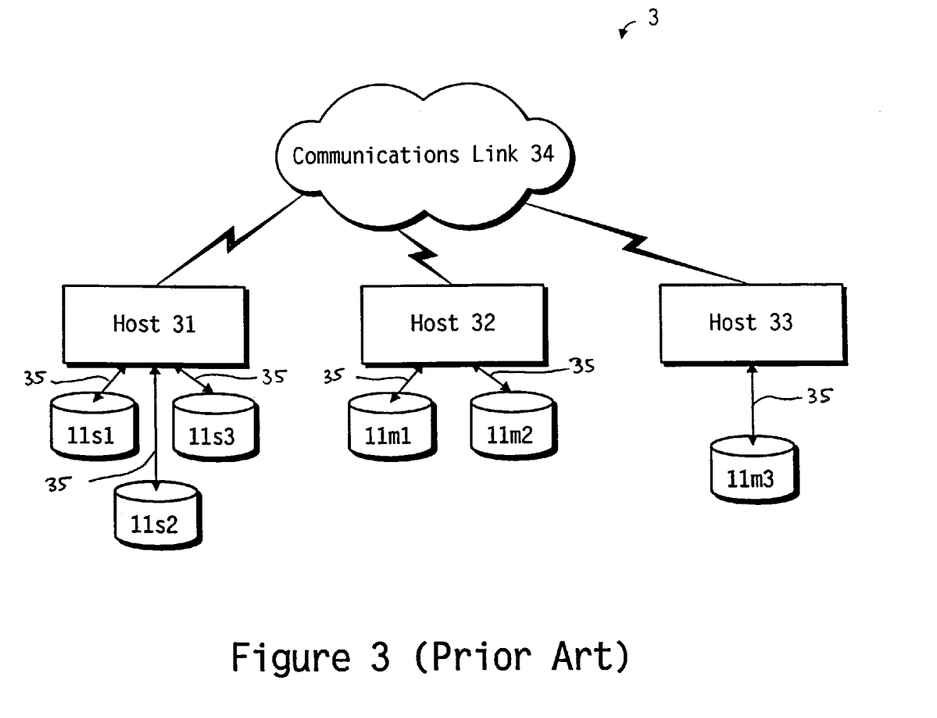
FIG. 3 illustrates a third computer system of the prior art.

FIG. 3 illustrates another computer system 3 of the prior art. The system 3 includes hosts 31, 32, 33, communication links 34, 35 and storage elements 11. The link 34 communicatively couples the hosts 31, 32, 33 while links 35 communicatively couple the hosts 31, 32, 33 to storage elements 11.

In operation, the system 3 designates all or a part of the storage element 11s1 attached to the host 31 as a source—likewise for the storage elements 11s2 and 11s3. Correspondingly, the system 3 designates (all or part of) the storage element 11m1 attached to the host 32 as the mirror for the source 11s1. The mirror 11m2 for the second source 11s2 also attaches to the host 32 while the mirror 11m3 for the third source 11s3 attaches to the third host 33.

Multiple sources 11s1, 11s2, 11s3 on a single host 31 may have mirrors 11m1, 11m2, 11m3 on multiple hosts 31, 32. Notably, the physical extents of any single mirror are still the responsibility of one host.

In the event that a system 1, 1' or 3 loses access to a mirror 11m, the system continues to serve read and write requests with the source 11s. Should the system instead lose access to the source 11s, the system may serve data requests from the corresponding mirror.

Once a system 1, 1' or 3 is compromised, system management (a software agent or the system administrator, for example) may seek to repair it. Management may designate another existing, single storage element as the mirror or may physically replace the lost element with a correctly operating one.

A system 1, 1' or 3 re-silvers the new mirror, typically by copying the data from the source onto the new mirror. The host responsible for the source (the original source or the original mirror, depending on the type of failure) copies data from the source to the new mirror. The copying is done sequentially, block by block. Where the host responsible for the source and the host responsible for the mirror are not the same host, the copying involves forwarding data blocks from the source host to the mirror host.

The data block currently being copied is termed herein the "watermark." Data that has already been copied to the mirror is below the watermark, and data that has yet to be copied is above the watermark.

While the mirror is being re-silvered, to achieve fault tolerance, a system 1, 1'or 3 keeps the source element 11 being re-silvered available to serve data requests. The system may receive data requests and satisfy those requests from the source element through the host responsible for that source element or, if the read is directed to a block below the watermark, through the synchronized portion of the mirror element.

The system may receive a data write request. If the data to be written is below the watermark, the system writes the data to the source element and to the new mirror element as well. However, where the data to be written is above the watermark, the system writes the data only to the source element. At some later point when the watermark moves over this new data, the system then copies the written data to the new mirror. A write request targeted at the watermark blocks until the watermark rises to another data block.

Where, however, a more sophisticated storage system replaces the storage system described above, this process of resilvering the mirror proves inefficient. For example, consider a storage system wherein the physical extents for a mirror volume are distributed across multiple hosts for efficient serving of data requests. If a single one of the multiple hosts re-silvers the entire mirror, efficiencies gained by the distribution are lost by the consolidation of the re-silvering responsibility in the one host.

Accordingly, there is a need for a storage system that distributes mirrors and does not lose distribution efficiencies during the re-silvering of a mirror.

If the host responsible for the source fails during the re-silvering, the systems of the art cannot complete the re-silvering. Because neither the source nor the mirror is available, the system loses access to the data. Fault tolerance has failed.

There is a also a need for a storage system that retains the efficiencies of distribution during the re-silvering of a mirror and still provides uninterrupted access to the data being re-silvered—even in the face of the failure of a volume participating in the re-silvering the mirror.

Still further, there is a need to efficiently perform initial synchronization of a distributed mirror.

These and other goals of the invention will be readily apparent to one of skill in the art on reading the background above and the description below.

SUMMARY

Herein are taught apparatus and methods for synchronizing a distributed mirror. A computer system incorporating the invention may divide a mirror source into N chunks, assigning N storage processors responsibility for respective chunks of the mirror. The storage processors then may communicate among themselves to synchronize a distributed mirror. The storage processors may communicate mirror source blocks or their addresses and host-initiated (user) data requests.

Before the communicating, data requests to the multiple storage processors are ordered to protect data integrity. The ordering may limit data write requests for a given data block on a given storage element at any given moment to either one (1) write data request or any number of read requests.

The chunks may be further divided into N equally sized chunks. Some or all of the chunks may be contiguous sets of blocks. Some or all of the chunks may be striped sets of blocks.

A storage processor may assist the synchronization of a mirror. The processor may accept responsibility for a chunk of a mirror source and communicate with a second storage processor responsible for another chunk of the mirror source to synchronize the mirror. The storage processor may track addresses of source blocks currently in use for synchronization, as well as addresses of source blocks to be synchronized after the blocks currently in use for synchronization.

The tracking of addresses of blocks to be synchronized may be done on a per-storage-processor basis. More particularly, the block addresses may be tracked on the basis of which storage processor is responsible for which block.

DESCRIPTION OF THE INVENTION

Glossary

| | |
|---|---|
| RAID: | Redundant Array of Independent Disks |
| RAID0: | RAID Level 0 |
| RAID1: | RAID Level 1 |
| SP: | Storage Processor |
| Virtual volume: | A collection of volumes, including virtual volumes. |
| Volume: | A collection of physical extents. |

Overview

Figure 4:
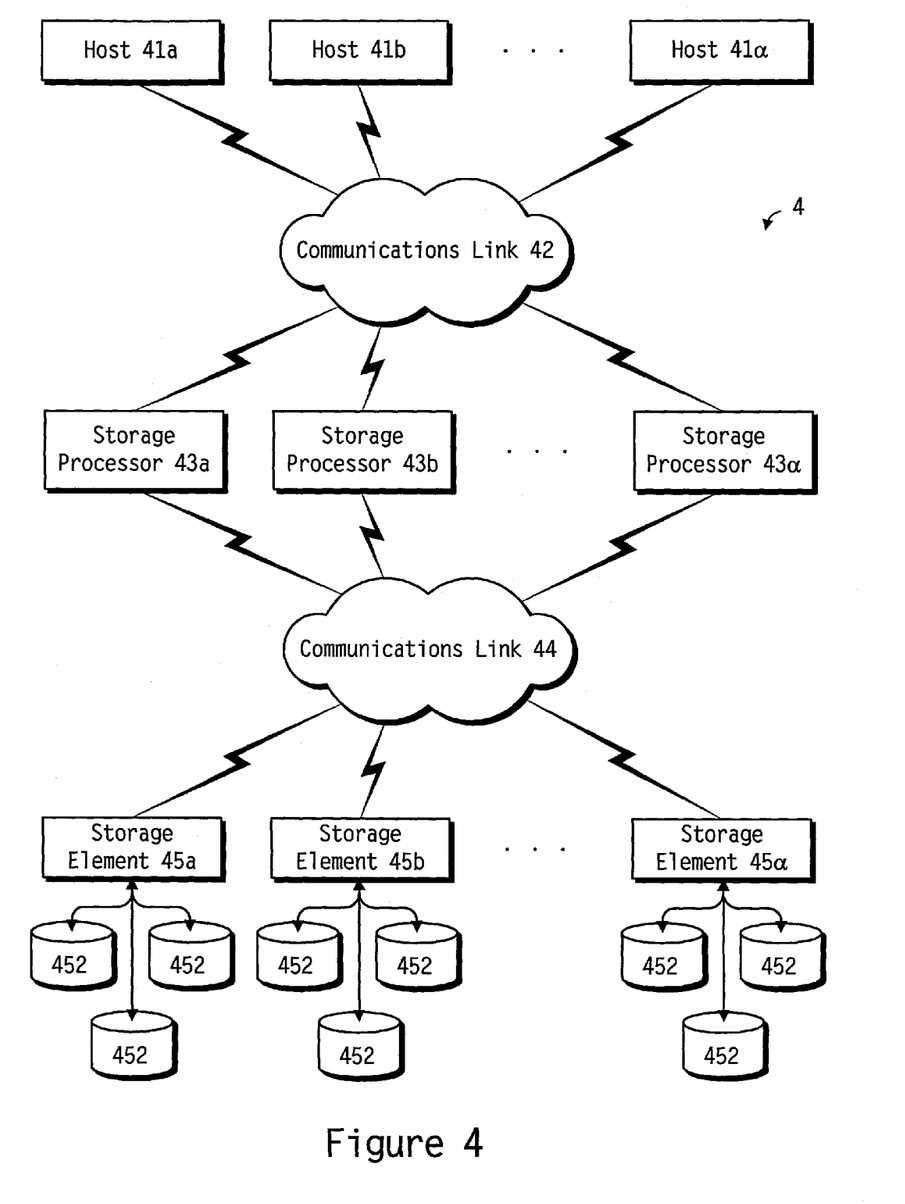
FIG. 4 illustrates a system incorporating an embodiment of the invention.

FIG. 4 illustrates a system 4 incorporating an embodiment of the invention. The system 4 may include one or more hosts 41, a communications link 42, one or more storage processors 43, a second communications link 44 and one or more storage elements 45. The link 42 communicatively couples the hosts 41 and the storage processors 43 while the link 44 communicatively couples the storage processors 43 and the storage elements 45. The link 44 may be standard or gigabit ethernet. The communication links 42 and 44 may be the same communications link, although they need not be.

The storage processors 43 may number 2, 4, 6, 8 16, ... $2^n$. The processors 43 may number in a range ($2^a$, $2^b$), $1 \leq a < b \leq n$.

A storage element 45 may include a controller or other intelligence (not shown) as well as one or more disks 452.

A physical volume may be a disk 452, a partition of the disk 452, or a number of blocks of the disk 452 or the partition. Virtual volumes are collections of volumes, physical, virtual or both.

U.S. patent application Ser. No. 10/078,248, entitled, "A Virtual Storage Network," naming as inventors David C. Lee et al., filed on Feb. 15, 2002, under an obligation of assignment to Intransa, Inc. of Sunnyvale, Calif. and incorporated herein by reference, further details a system into which the invention can be incorporated. Likewise, U.S. Provisional Patent Application No. 60/280,588, entitled, "A Virtual Storage Network," naming as inventors David C. Lee et al., filed on Mar. 30, 2001, assigned to Intransa, Inc. of Sunnyvale, Calif. and incorporated herein by reference, also details a system into which the invention can be incorporated.

Data Structures

The first data structure is a lists of block addresses of a volume.

An second data structure is an object for quickly locating a block such as a hash table hashed on block addresses or a sorted search tree. An entry in a hash table may contain state information such as whether the entry is in use, the change log to which the entry belongs, the identity of the volume for which the entry is relevant or the identity of the thread that is currently writing into the block the entry represents.

A change log may couple a block-address list and hash table. Proper use of the hashing ensures that a given block address is in the change log at most once.

A watermark variable may represent the block or range of blocks that a storage processor 43$n$ is currently synchronizing.

A round counter may count the number of times a storage processor 43$n$ walks through its local current-changes log.

Protocols

Mirroring associates two or more copies of the same data. The copies may be volumes. The volumes may be physical or virtual.

For purposes of illustration, the storage processors 43 number M, and the storage processors 43 participating in synchronization number N (N≦M). Each of the N processors 43 has a unique identifier n, 0≦n≦N−1, and is herein generically referred to as "processor 43$n$." Each processor 43$n$ knows the identifier (ID) of each of the other processors 43$n$. The unique identifiers may be assigned or negotiated at system start up.

The blocks of the source volume number S. The system 4 divides the S blocks of the source volume into N segments or "chunks." Each processor 43$n$ is responsible for a respective chunk, herein termed "chunk$_n$." The chunks may be equally sized (±1, of course), and the blocks of a chunk may be contiguous—although neither condition need be true.

Herein, the term "processor 43$i$" (1≦i≦n) refers to a specific processor 43$n$, typically the one then being discussed. The term "processor 43$k$" (i≠j) refers to one of the remaining N−1 processors 43$n$.

The term "chunki" refers to the specific chunkn for which the processor 43$i$ is responsible, typically the chunk then being discussed. "Chunkk" refers to one of the remaining N−1 chunks for which a respective one of the remaining N−1 processors 43$k$ is responsible.

A chunk may be a contiguous set of blocks or a striped set. A striped chunk is not itself contiguous but instead consists of multiple contiguous segments of a volume. Striping balances loads and avoids hot spots. If the mirrored volume is already striped as with, for example, a RAID0 volume, the synchronization may use the same stripes.

Volume Management

Volume-manager software (control software) may control and manage the storage elements 45, typically disk arrays or tape arrays. A volume manager may present the storage elements 45 it controls to the hosts 41 as one or more virtual media, typically volumes. The volume manager may execute in a disk controller, intelligent host bus adapter (HBA) or a host computer.

A volume manager may reside in each of the storage processors 43. In addition to the virtualization described above, the volume manager may provide other block-level functions such as snapshot, mirroring and caching.

Request Ordering

Multiple hosts 41 or multiple storage processors 43 may request access to a given data block on a given storage element 45. A single host may request access to the same block multiple times.

A protocol may assure that the data requests to the storage processor are ordered to protect data integrity. For example, the hosts 41 may cooperate to order writes issued to the storage processors 43 such that no more than one data write request for a given data block on a given storage element 45 exists at any given moment. Additionally, either such a write request or any number of read requests for the given block may exist at any given moment.

Mirroring

Multiple storage processors 43 may simultaneously access a volume and its one or more mirror volumes. If a source volume fails, its mirror volume may serve user requests. The mirror volume may serve a read request from a host 41. A write request may be written into source and mirror volumes before the user receives a confirmation.

Initial Synchronization Phase

An initial synchronization phase starts mirroring. Initial synchronization copies the entirety of a source volume to one or more mirror volumes. At the instant synchronization completes, the source volume and each of the mirror volumes are identical with respect to content. The hosts 41 may access the source volume while the initial synchronization occurs.

After the initial synchronization phase, any update to the original volume that a host 41 initiates, the storage processors 43 may also perform on the mirror volume. This is the mirror phase.

If the volume fails during the mirror phases, the processors 43 use its mirror so that a host 41 does not detect any interruption in its access to the volume. The storage processors 43n may synchronize a replacement mirror (or a new mirror) in parallel as described herein.

Figure 5A:
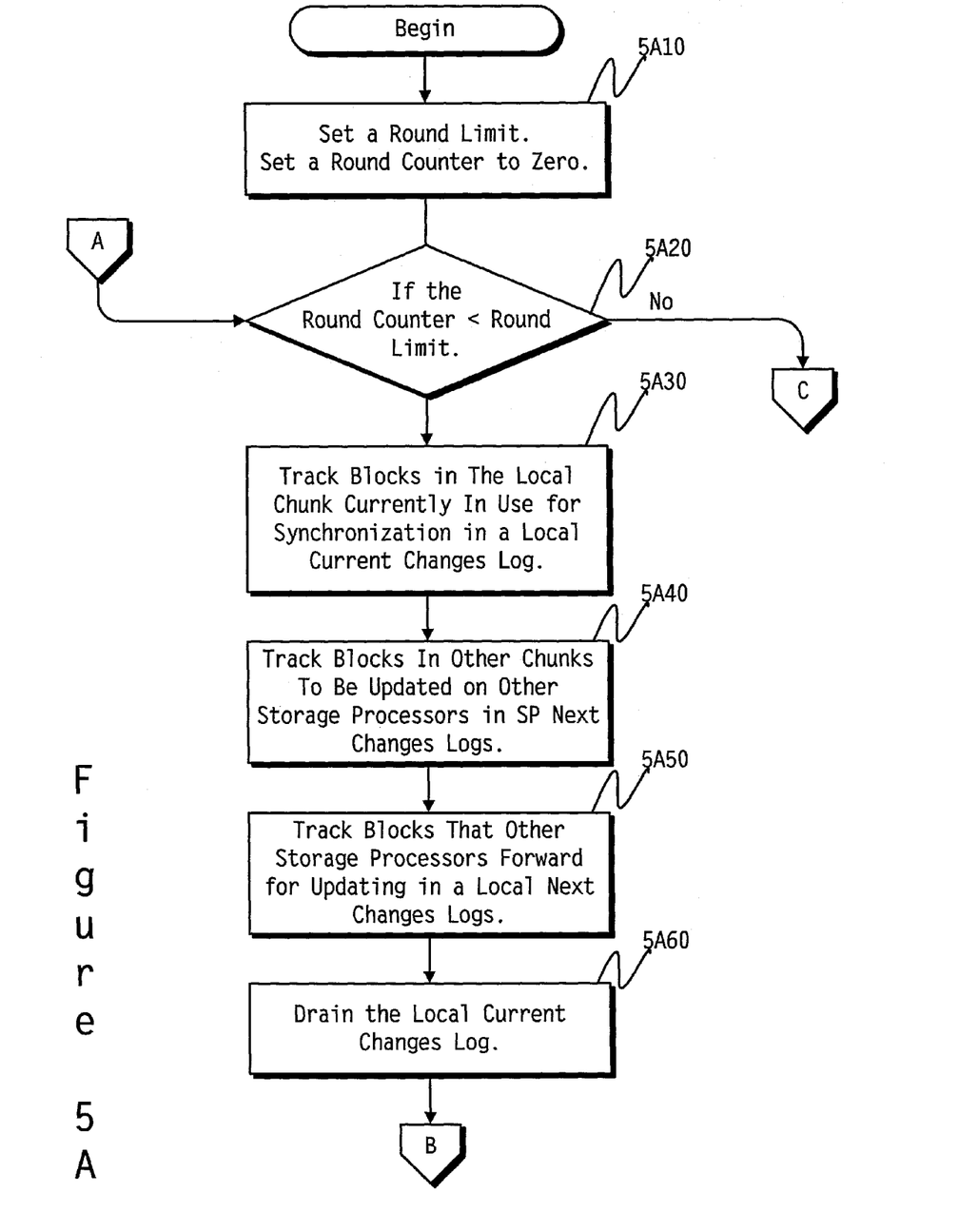
FIGS. 5A–5C compose a flowchart illustrating the overall flow of synchronization
Figure 5B:
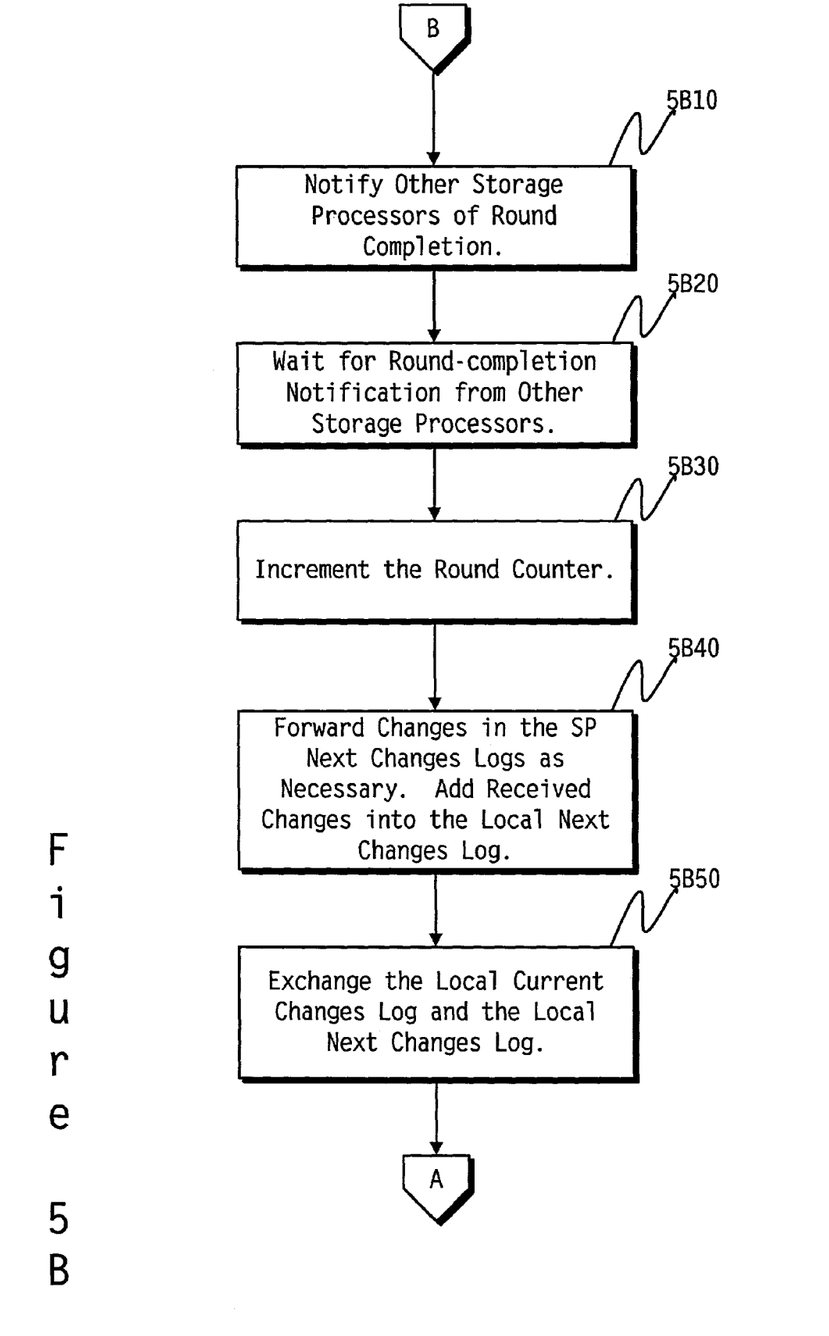
Figure 5C:
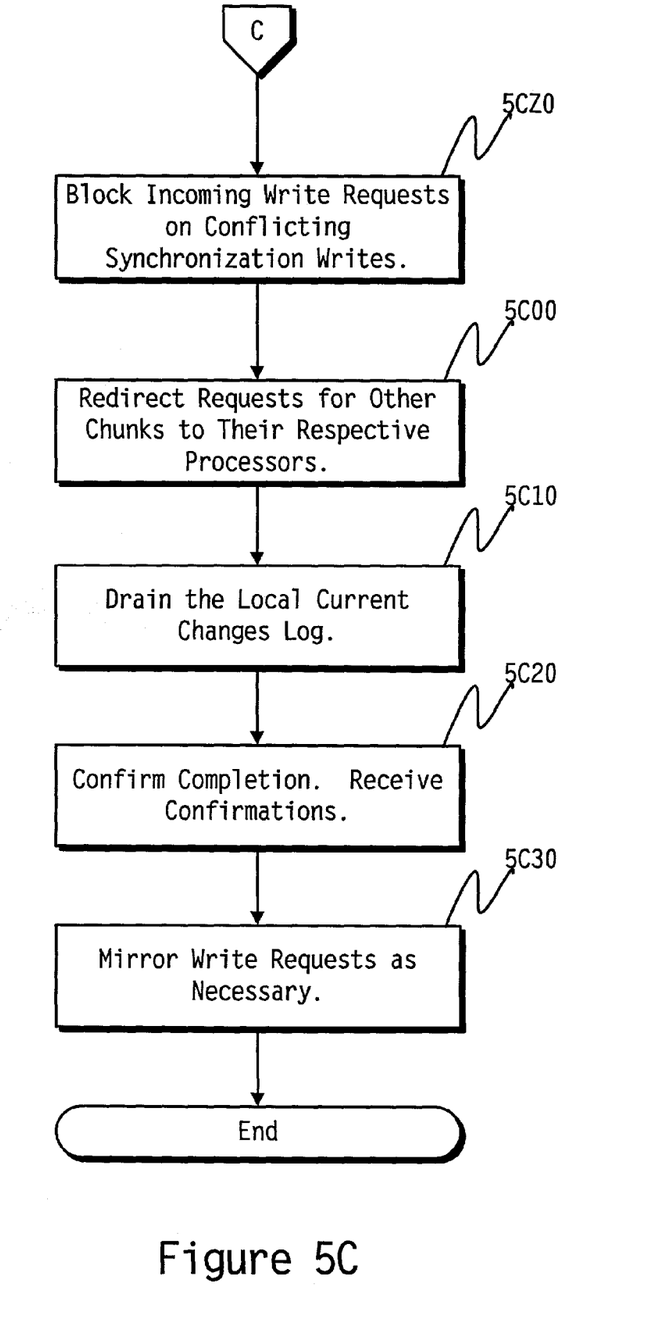

FIGS. 5A–5C illustrate the overall flow of synchronization. Each storage processor 43n may maintain one or more change logs for the source volume. The processor 43n may use a change log to log block addresses for further processing. Multiple logs on a processor 43n may use the same hash table.

When a thread is about to initiate a write to a block, it may mark as Busy the hash-table entry for the block, by writing its thread ID into the entry's Busy field, for example. When the write operation completes, the thread may change the hash entry's Busy field back to some predetermined value such as zero.

A synchronization thread may synchronize a volume chunk. The thread may be a kernel thread. Each storage processor 43n may have one or more synchronization threads per synchronization process. Multiple synchronization processes may also exist, even in the same mirror set.

Each processor 43n may synchronize its respective chunk chunkn. The processor 43i handles write requests to chunksk other than its respective chunki as described below.

A processor 43i may maintain N+1 change logs per synchronization thread. A first change log may list addresses currently in use for the synchronization, step 5A30. This first change log is herein termed, the "local current-changes log."

Each of N−1 change logs may contain lists block addresses to update, at the end of a synchronization phase, a respective one of the other N−1 storage processors 43k, step 5A40. These change logs are herein termed "SPk next-changes logs."

The last change log may list addresses that processors 43k other than the subject processor 43i provide during a synchronization phase, step 5A50. This last change log is herein termed, the "local next-changes log."

Each mirror set may use a log to ensure consistent data when a write fails. This log and its use are described further herein.

The synchronization phase may have several rounds. In each round, a storage processor 43i may replace its local current-changes log with its local next-changes log, step 5B50. The processor 43n may then log future changes into a new local next-changes log, step 5A30.

The local current-changes log may initially list all the blocks of the chunki for which a processor 43i is responsible. The other change logs may be empty. The thread may use the local current-changes log to synchronize the mirror chunk for which its processor 43i is responsible.

Round 1

The synchronization process may scan the chunk from its first block to its last in order to synchronize the mirror in this order. A watermark variable may represent the block or range of blocks that the storage processor 43i is currently synchronizing. The storage processor 43n may insert the watermark block into the hash table.

The storage processor 43i may insert write requests into the hash table as described below, except that the storage processor 43n may send a write request above the watermark to the source volume and not to the target.

Subsequent Rounds

In a subsequent round, the synchronization thread may walk through its local current-changes log for a block to copy. If an entry is marked Busy (a host-initiated write is in progress, for example) or Done (a host-initiated write already synchronized it, for example), the thread may skip this (represented) block and continue to walk the log. Otherwise, the synchronization process may mark the entry Busy (indicating a read is in progress, for example) and read the block.

When the read returns, the synchronization process may check the entry's status. If the entry is Busy (due to a host-initiated write, for example) or is Done, the process may skip the block and continue walking the log.

Otherwise, the synchronization process may modify the entry to indicate a write is in progress and synchronize the block with the mirror volume or volumes. When the synchronizing write completes, the process may remove the entry from the local current-changes log and the local next-changes log, and dispatch any requests waiting on the entry. A host-initiated write request, for example, may block on the entry in the Final Phase described herein.

If a log contains adjacent block addresses, the synchronization thread may synchronize a range of blocks by marking the adjacent blocks as Busy and then doing a multi-block copy. The system's management may limit the size of multi-block copies because, inter alia, the thread may not be able to mirror write arriving user writes for the blocks being synchronized and have to synchronize them later.

During the walking of the local current-changes log, the synchronization thread may handle host-initiated writes and change-log entries from other storage processors 43n. When a storage processor 43i receives a host-initiated write directed to its respective chunki, the processor 43i may write the data as requested into the source volume. The processor 43i may then check the hash table to determine whether the block exists in the local current-changes or local next-changes log. If the block is not there, the processor 43n may write the request into the mirror volume or volumes. This is a below-the-watermark scenario.

If a local current-changes log entry exists for the block and the entry is not Busy, the processor 431 may mark the entry Busy and mirror write the block. When the write completes, the processor 43i may remove the entry from the local current-changes and local next-changes logs. This is a modified above-the-watermark scenario, "modified" because mirror writes occur above the watermark.

If a local current-changes log entry exists for the block and the entry is Busy, the processor 43i may add the block address to the local next-changes log. The block will be synchronized in the next phase.

If a local current-changes log entry exists, and it is Busy reading from source(s), the synchronization process may mark the entry Busy for user write and mirror write the block. When the write completes, if the entry is still Busy for read by the synchronization thread, the process may not remove the entry and instead mark it Done. If the entry is marked Done, the synchronization thread does not write the data it read to the target.

An incoming user request may contain a range of blocks rather than a single block. These blocks may all fit in a single chunk or may span multiple chunks. The processor 43i may mirror write as many of these blocks as possible without creating conflicts for updates by other processors. The processor 43i may do so while at the same time not delaying user writes if one or more of the blocks they requested are currently being synchronized.

For example, the synchronization thread may write the entire request to the source volume. Where a local current-changes log entry exists for all of the blocks of the request and all the entries are not Busy, then the thread may mark the entries Busy.

For each block in the range where a local current-changes log entry exists for a block of the request and that entry is Busy, the thread may add an entry for the block to the local next-changes log. The thread may also create a new multi-block write request for each sub-range of blocks that excludes these Busy blocks and write the request(s) to the target volume(s).

For each block in the range that is not within chunki, the synchronization thread may add an entry for the block in the SPk next-changes log for the storage processor 43k responsible for the block.

When the new multi-block write requests complete, the synchronization thread may clear the local current-changes and next-changes logs for the blocks in the new multi-block write requests. The thread may then return a result to the host.

As another illustration, after writing the entire request to the source volume, the synchronization thread may then execute a routine similar to the following C-like pseudo-code. (Let chunki be the local chunk that SPi processes):

```
StartBlock = the first block of the request
LastBlock = StartBlock
Step4:
    while ( LastBlock is within chunki and is within the request
                                                             block )
    {
        if ( the LastBlock has a Busy entry in the local current-
                                                      changes log )
        {
            if ( the range has at least one block )
                Create a new write request for the range
                  [ StartBlock, LastBlock − 1 ] and write it to the
                  target volume(s).
                Create an entry in the local next-changes log for
                                                          LastBlock.
                StartBlock = LastBlock + 1.
                LastBlock = StartBlock
                continue
        }
        if ( LastBlock has an entry in local current-changes log but
                                                the entry is not Busy )
            Mark the entry Busy.
        LastBlock++
    }
Step5:
    while ( LastBlock is within the request block but is in another
                                          chunkk, not within chunki )
    {
        Create an entry for LastBlock in the SPk next-changes log,
        where SPk is the processor responsible for that block.
        LastBlock++
    }
Step6:
    if ( not finished )
        goto Step4
Step7:
    Wait until all write requests that were sent in the while at Step4
    have completed, then clear both local current-changes log and local
    next-changes log entries for them and reply to the host with the
    result.
```

If an incoming write request falls outside the local chunki, the synchronization thread may write the source volume or volumes and add entries as necessary into the SPk next-changes log, where SPk is the processor 43k responsible for that block. When the SPk next-changes log buffer fills, the thread may send the entries to that storage processor 43k.

When a storage processor 43i receives change-log updates from other processors 43k, the local processor 43i may add the entries to its local next-changes log. In one embodiment, processors 43k send only the block address. This limitation may remove write-ordering issues following from a given block being updated by different processors 43k at different times.

When the synchronization thread has drained the local current-changes log, step 5A60, the storage processor 43i notifies the other processors 43k that it completed the current round, step 5B10. The local processor 43i may wait for completion notifications from the other processors 43k, step 5B20, before beginning the next round. While it is waiting, the processor 43i may serve write requests and change-log updates from other processors 43k.

When the processor 431 receives the completion notifications from the other processors 43k, it may increment its round counter, step 5B30, and =send any remaining entries in the SPk next-changes logs to their respective processors 43k while integrating any entries it received in the process into its own local next-changes log, step 5B40. The local processor 43i may then exchange the now empty local current-changes log with the now populated local next-changes log, step 5B50, and start processing that new local current-changes log.

The processor 43i may repeat the processing of the local current-changes log for a predetermined number of rounds, step 5A10. When that limit is reached, step 5A20, the processor 43i may begin the Final phase.

Final Phase

In the Final phase, the local storage processor 43i may drain its change log and mirror write a new write request into its chunki. The processor 43i may redirect a new write request outside its local chunki to the processor 43k responsible for that block. A redirected request is written into the source volume or volumes and then forwarded to the other processors 43n. Thus, the processor 431 may not update the local next-changes log or the SPk next-changes log.

A storage processor 43n may handle direct writes and writes redirected from other storage processors 43n similarly. The local storage processor 43i may write a redirected write into the target volume or volume. The redirecting storage processor 43k has written the source volume or volumes.

If the request is a user write, the thread may write the block into the source volume or volumes.

The synchronization thread may check the hash table to see if a local current-changes log entry exists for this block. If no local current-changes log entry exists for this block, the synchronization thread may mirror write the request to the target volumes. This is the below-the-watermark scenario.

If a local current-changes log entry exists but the entry is not Busy, then the synchronization thread may mark the entry Busy and mirror write the block. When the write completes, the thread may remove the entry from the local current-changes log. This is the modified above-the-watermark scenario.

If a local current-changes log entry exists and the entry is Busy on writes to mirror volume or volumes, the synchronization thread may queue the user request on the log entry. The synchronization thread may wake up waiting threads when it completes.

If a local current-changes log entry exists and the entry is Busy on reads from source volume or volumes, the synchronization thread may mark the entry Busy for user write and mirror write the request. When the mirror write completes, if the entry is still Busy on a read by the synchronization thread, the thread may not remove it and instead may mark it done. The synchronization thread may not write the data it read to the mirror if the entry is marked Done.

If the write request is a redirected request, the synchronization thread may return the result of the write when it completes to the storage processor 43k that redirected that block.

An incoming user request may contain a range of blocks rather than a single block. These blocks may all fit in a single chunk or may span two or more chunks. The user thread may block until the entire request is mirror written.

For example, the synchronization thread may write the entire request to the source volume. Where local current-changes log entries exist for blocks of the request and the entries are not Busy, then the thread may mark the entries Busy.

For each block in the range request where a local current-changes log entry exists for the block and another thread has marked that entry Busy, this thread may queue the user request on the first such entry. When the thread wakes up, it may mark as Busy all of the entries that are now not Busy. The thread may then create a new multi-block write request for each sub-range of blocks that includes these Busy blocks and write the request(s) to the target volume(s).

For each block in the range that is not within chunki, the synchronization thread may create a new write request for the block (or range of blocks) and send it to the storage processor 43k responsible for the block (or range).

When the thread receives a response for any new write requests, the synchronization thread may then return a result to the host.

As another illustration, after writing the entire request to the source volume, the synchronization thread may then execute a routine similar to the following C-like pseudo-code:

```
StartBlock = the first block of the request
LastBlock = StartBlock
Step4:
    while ( LastBlock is within the local chunki and is within the
                                                    request block )
    {
        if ( the LastBlock has an entry in the local current-changes
                                log and the entry is not Busy )
            Mark the entry Busy.
        LastBlock++
    }
Step5:
    while ( there are entries in the range [ StartBlock,
              LastBlock − 1 ] that are marked busy by another thread )
    {
        Queue the user request on the first such entry.
        When the thread wakes up, mark all entries that became not
                                                    Busy as Busy.
    }
Step6:
    Create a new write request for the blocks [ StartBlock,
              LastBlock − 1 ] and write it to the mirror volume(s).
Step7:
    while ( LastBlock is within the request block but is not within the
                                                    local chunki )
    {
        Create a new write request for this block or range of blocks
            and send it to the processor responsible for this block.
        LastBlock++
    }
Step8:
    if ( not finished )
    {
        StartBlock = LastBlock
        goto Step4
    }
Step9:
    If any portion of the request was redirected to another processor,
    wait for all responses to come back and then reply to the host.
```

A request completes successfully if the write to the source volume or volumes completes successfully. If any writes to the mirror volume or volumes fail (on the local or remote processor), the system 4 takes the failed volumes offline and halts the synchronization. However, the thread may send the response to the user when all responses arrive. This ensures that error handling was done for the mirror.

A storage processor 43i may redirect an incoming user write request that falls outside chunki to the processor 43k responsible for that block, step 5C00. When the responsible processor 43k replies, the local processor 431 may respond to the host.

When a storage processor 43i finishes synchronizing its change log, step 5C10, the processor 43i may send a confirmation to the other processors 43k, step 5C20. When the processor 43i receives such a confirmation for a processor 43k, the processor 43i may not forward any write requests to the processor 43k but instead may mirror write these requests, step 5C30. By maintaining status for each chunk, a processor 43i may know which processors 43k have finished and which processors 43k still need their writes redirected.

The synchronization process completes when all the storage processors 43n complete their Final Phase.

Error Handling During Synchronization

A storage processor 43n may crash, stop responding or otherwise fail during the synchronization phase. Another storage processor 43n may take over the responsibilities of the failed storage processor 43n. If the change logs were written to disk or mirrored in another processor 43's memory, the failover processor 43n may read the change logs to restart. Alternatively, the failover processor 43n may use initial synchronization on the chunk that was local to the failed processor 43n.

A storage processor 43n may fail without its change logs being saved externally (on disk, on another storage processor 43n's memory, etc.). Synchronization restarts—but only for the failed chunk.

Multiple synchronizations may start at different times, all of which may be in progress simultaneously. The synchronization process may continue even if one of the members of a mirror set fails or if more members are added during synchronization.

The system 4 may synchronize multiple targets when they are in the same state. For example, two new volumes joining the mirror set both need synchronization. The system 4 synchronizes the multiple targets in one synchronization process. The synchronization process copies blocks into multiple target volumes rather than one as described above.

When a mirror member fails, the processors 43n may recognize the failure and start a change log for the failed processor 43n for later re-synchronization. System management may decide to maintain or discard the change log, depending, for example, on whether the mirror will be back online soon.

If a write error for the target occurs while the mirror set is undergoing synchronization, the synchronization process may suspend and generate a change log for the synchronized portion of the target. When the error clears, the synchronization process may continue from the point of suspension after the changes in the log are synchronized.

The synchronization process may write the change logs to disk, possibly synchronously. If the process cannot read the written logs, it may initiate synchronization.

Online Mirroring

Online mirroring occurs when two or more mirrors are in synchronization and available. User reads may go to any volume (considering, perhaps, some efficiencies such as last-block-read and load balancing). A user write request may go to all the mirrors before a processor 43 acknowledges the request to the user.

In the case of write failure, error recovery may ensure that the mirrors contain the same data for that block. For example, a short-term change log may exist for online mirroring as well. Before a processor 43 writes a request to the mirror, it may create an entry for all blocks in the request. The processor 43 may remove the entries when it receives a response. In the event of an error on any of the mirrors, the processor 43 may use the log to ensure that all the active volumes contain the same data. The validity of the data may be less important where the user receives an error on the failed request, but the data is the same on all the active mirrors.

When a mirror is removed from the set, management (a management agent or system administrator) may start a change log for the changes going into the mirror set. That is to say, a logging thread may start for the removed mirror. Each Storage processor 43i may log write requests going into its local chunk into its local next-changes log and log write requests for a chunk on processor 43k into the SPk next-changes log. When the removed volume is rejoined (re-silvered) to the set, the synchronization process uses these change logs as initial logs.

In certain cases, such as a network split, one or more connections between storage processors 43n and some of the mirrors may fail. Different processors may assume that different mirrors failed. Some processors 43n may thus continue to access mirrors independent of the other processors 43n. When the network is restored, each of these mirrors may contain different data that was written during the network split.

Rather than merging such changes, the system management may instead choose one mirror as a master and throw away the changes of the other mirrors.

An initial synchronization may ensure that the mirrors can be rejoined. However, this solution is slow and does not preserve the changes in the other mirrors.

A storage processor 43n may detect that a mirror member is not responding, by, for example, detecting the failure of a heartbeat or being instructed by management to mark the mirror member disabled. The processor 43n may not use the mirror member anymore for any I/O operations. The processor 43n may start a change log for the mirror member that contains the block addresses of blocks that change after the mirror breaks. That change log may be written to disk or mirrored in another storage processor 43's memory.

The same mirror set may have different change logs for each failed member, as different members may fail at different times. Thus, if two members have different changes made during the time they were separated, two sets of change logs will exist—one for each member, created and maintained by that member storage processor.

To re-silver the mirrors after a split brain, the system management may determine which mirror is most correct. That selected mirror is the source for the synchronization process.

The synchronization thread may merge the change log of this source and of the one or more targets to create the initial change log for the synchronization process. Alternatively, the synchronization process may combine the logs one at a time for each target mirror and use a different combined change log for each target.

The synchronization process may copy blocks from the source volume whether they were originally changed on the source, target or both. At the end of the process, the targets are identical to the source.

Management may preserve the changes in the target members in the face of the changes being overwritten by the synchronization thread when the mirror set is re-silvered after a split brain. To this end, the management may create a snapshot volume for each target mirror member when the synchronization starts. As the synchronization thread copies the blocks in the change log to the target, the original blocks on the target are copied to the snapshot.

Herein have been taught the initial and incremental synchronization of volumes in a mirror set by dividing the volume between the different processors so that each one is responsible to synchronize only its own chunk. Initial and incremental synchronization are I/O- and processing-intensive operations. Dividing the work between the processors speeds up these tasks proportionally to the number of processors involved in the synchronization.

Dividing the work also makes the system more robust. Unlike non-distributed synchronization systems, if one processor here fails, synchronization nonetheless proceeds.

The mirror-set processors synchronize data among themselves using change logs and redirection. Uninterrupted read and write access to the mirror set to users accompanies minimal-to-no data redirection, performance impact or additional storage. The invention applies to RAID1 disk mirroring and to virtual volume mirroring.

The embodiments are by way of example and not limitation. Modifications to the invention as described will be readily apparent to one of ordinary skill in the art.

For example, while the data storage is described above primarily in terms of disks, one of ordinary skill will recognize that any computer-readable data storage device may serve. Such data storage devices could include tapes, static RAM, optical storage and other persistent memory.

As another example, a processor 43$n$ may divide its chunk$n$ into multiple sub-chunks. Then multiple synchronization threads may exist for the same synchronization process, each responsible for a respective sub-chunk$n$.

As yet another example, for recovery purposes, the logs may be written to disk. However, logging each write synchronously to disk may slow down user requests. If the logs are not persistent and a processor fails, restarting the synchronization process may recover the data. Persistent logs are preferable.

To handle the breaking and later re-silvering of a mirror, the logs may be written to disk. The written logs may be maintained for a long time.

Maintaining persistent logs but not synchronizing the writes may improve logging performance and result in complete logs in the event of a graceful shutdown. Some data may be lost if the processor crashes and complete synchronization may be necessary.

What is claimed is:

1. A method for synchronizing a distributed mirror including a source volume and a mirror volume, the method comprising the steps of:
   providing a plurality of storage processors in communications with one or more hosts, said plurality of storage processors receiving data requests from the one or more hosts;
   providing one or more storage elements in communications with the plurality of storage processors, said one or more storage elements including the source volume and the mirror volume;
   dividing the source volume into N chunks;
   assigning N storage processors of said plurality of storage processors responsibility for synchronizing different chunks of the mirror so that the source volume and the mirror volume are identical with respect to their data content;
   within a first of said N storage processors, maintaining a local log of addresses within said chunks to be synchronized by said first of said N storage processors, and maintaining a log of addresses within said chunks to be synchronized by others of said N storage processors; and
   communicating among the N storage processors to synchronize the distributed mirror.

2. The method of claim 1, wherein the step of communicating comprises
   communicating the addresses within said chunks to be synchronized by others of said N storage processors to respective ones of the others of said N storage processors; and
   communicating host-initiated data requests among the storage processors, thereby synchronizing the mirror.

3. The method of claim 1, wherein the step of dividing comprises
   dividing the source volume into N equally sized chunks.

4. The method of claim 1, wherein the step of dividing comprises
   dividing the source volume into chunks, each chunk being a contiguous set of blocks or a striped set of blocks.

5. In a system comprising at least one host having access to a plurality of distributed storage elements through a plurality of storage processors, a method performed by each storage processor for distributing the synchronization of a distributed mirror set associated with the storage elements, the distributed mirror set including a first mirror having a first source volume, the method comprising the steps of:
   accepting responsibility on the storage processor for synchronizing a chunk of the first source volume;
   maintaining a first log for tracking storage blocks in the chunk to be synchronized by the storage processor in a current round of synchronization and at least one second log for tracking storage blocks in the first source volume to be synchronized by at least one other storage processor; and
   communicating the at least one second log to the at least one other storage processor.

6. The method of claim 5, wherein the step of maintaining comprises:
   evaluating an entry in the first log to determine if a block associated with the entry should be the next block to be synchronized.

7. The method of claim 6, wherein the evaluating step comprises:
   determining if the block associated with the entry is subject to a user write currently in process or has already been synchronized by a user write.

8. The method of claim 6, wherein the step of maintaining further comprises:
   in response to a determination that the block associated with the entry should be the next block to be synchronized, marking the entry as being synchronized, synchronizing the block associated with the entry by writing the content in the block into a target volume associated with the first source volume, and removing the entry from the first log.

9. The method of claim 5, wherein the first log comprises entries associated with a range of contiguous blocks and the method further comprising marking all entries associated with the range of contiguous blocks as being synchronized and synchronizing the range of contiguous blocks by making a multi-block copy of the content in the range of contiguous blocks into a target volume in response to a determination that none of the range of contiguous blocks is subject to a user write or is being synchronized by a user write.

10. The method of claim 5, further comprising maintaining a third log for tracking blocks in the chunk to be synchronized by the storage processor in a next round of synchronization.

11. The method of claim 10, wherein the steps of maintaining comprise:
   receiving a user write request into at least one block;
   for each of the at least one block, determining if the block is within the chunk; and
   in response to the determination that the block is within the chunk:
      writing the request into the block;

if there is no entry associated with the block in the first log, mirroring the request to a target volume associated with the first source volume, and if an entry associated with the block exists in the third log, removing the entry from the third log;

if there is an entry associated with the block in the first log and the block is not being synchronized, marking the entry in the first log as having been written, mirroring the request to the target volume, and upon completion of the mirroring, removing the entry from the first log; and if there is an entry associated with the block in the first log and the block is being copied into the target volume, adding an entry associated with the block in the third log.

12. The method of claim 10, wherein the steps of maintaining comprise:

receiving block addresses to be synchronized by the storage processor from at least one other storage processors;

adding entries associated with the received block addresses into the third log; and moving entries in the third log into the first log after the first log has been drained.

13. The method of claim 5, wherein the step of maintaining comprises:

receiving a user write request into at least one block;

for each of the at least one block, determining if the block is within the chunk; and in response to the determination that the block is not within the chunk:

writing the request into the block; and adding an entry associated with the block in the at least one second log.

14. The method of claim 5, further comprising notifying other storage processors that the current round has been completed in response to the first log having been drained.

15. The method of claim 5, further comprising:

receiving a write request into a block in another chunk assigned to another storage processor;

writing the request into the block;

forwarding the request to the other storage processor responsible for the other chunk; and upon receiving a response from the other storage processor, responding to a host from which the request is received.

16. The method of claim 5, wherein the mirror set includes a second mirror having a second source volume, the method further comprising:

accepting responsibility for synchronizing a chunk in the second source volume; and in response to the second mirror being removed from the mirror set, logging into a first change log user write requests going into the chunk in the second source volume; and logging into at least one second change log user write requests going into at least one other chunk in the second source volume.

* * * * *